Nov. 23, 1965   B. F. REILAND   3,218,905
SELF-TAPPING OR THREAD-FORMING SCREW
Filed April 30, 1962   2 Sheets-Sheet 2
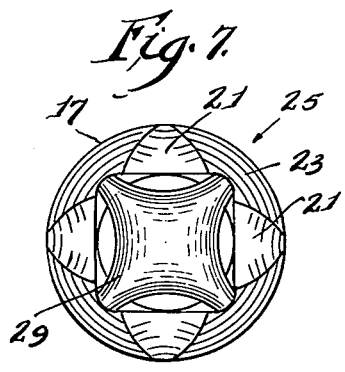
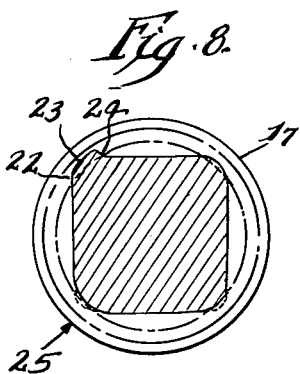
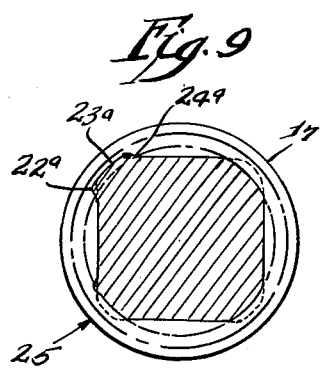
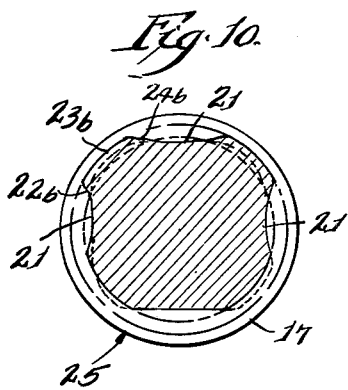
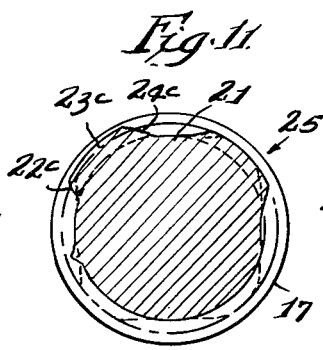
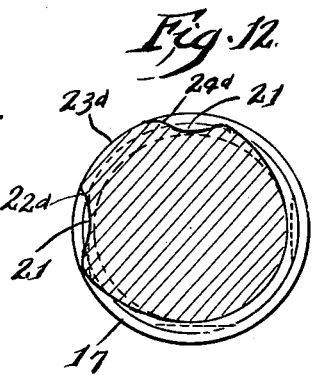
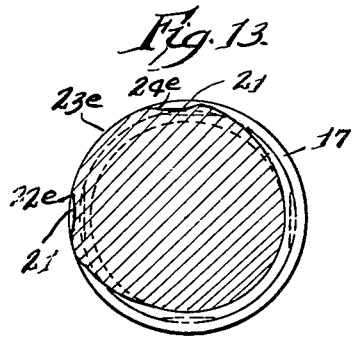
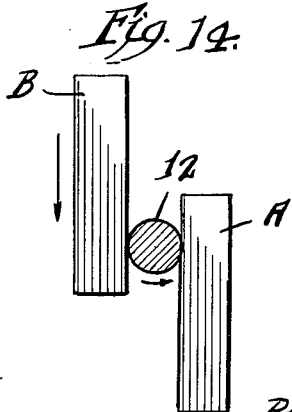
Inventor
Bernard F. Reiland
By Wilson & Geppert
Attorneys.

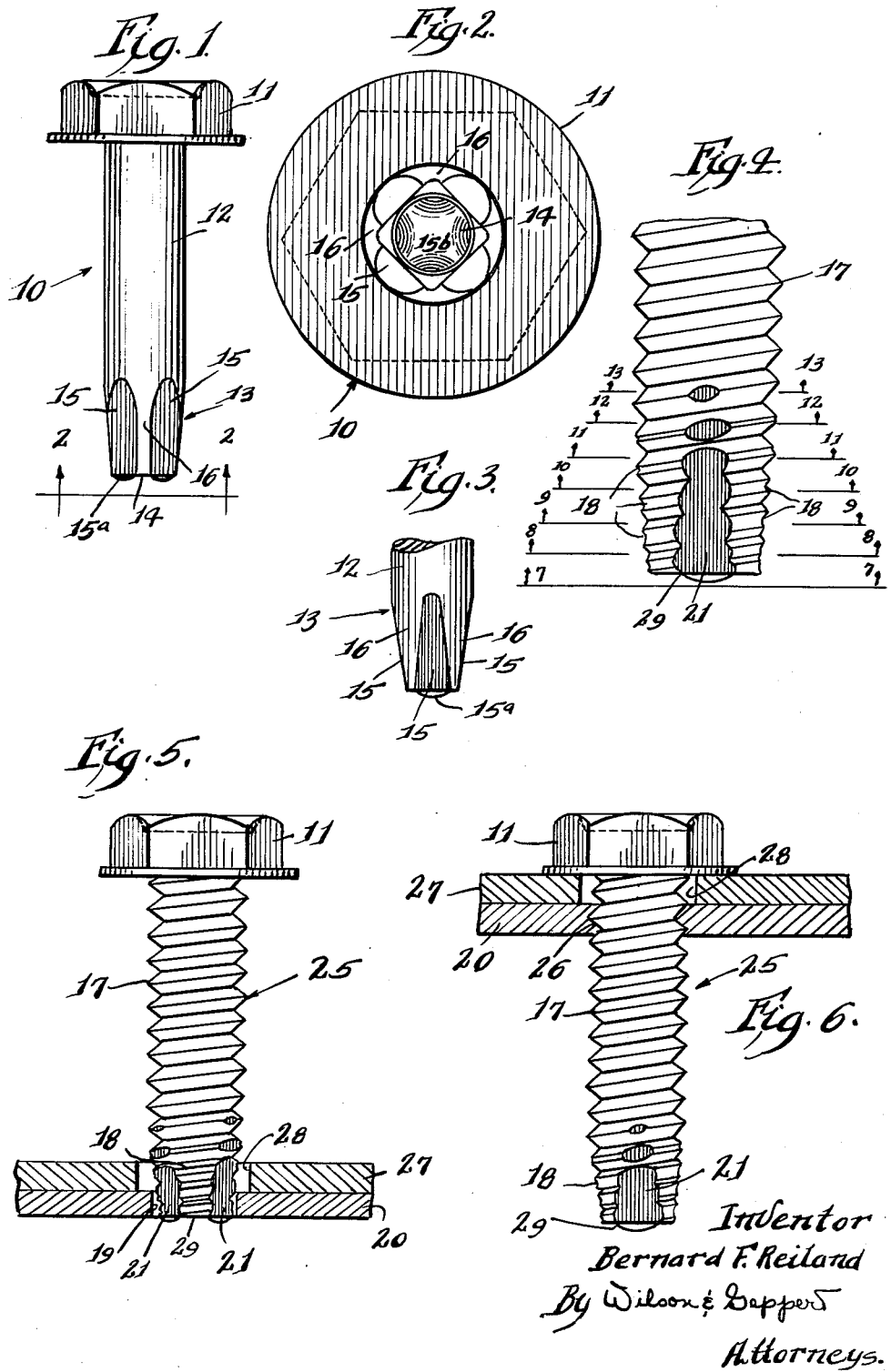

United States Patent Office 3,218,905
Patented Nov. 23, 1965

3,218,905
SELF-TAPPING OR THREAD-FORMING SCREW
Bernard F. Reiland, Rockford, Ill., assignor to National Lock Co., Rockford, Ill., a corporation of Delaware
Filed Apr. 30, 1962, Ser. No. 191,146
2 Claims. (Cl. 85—47)

The present application is a continuation-in-part of my copending application Serial No. 93,650, filed March 6, 1961, now abandoned.

The present invention relates to a self-tapping thread-forming screw and especially to a novel screw or fastening element for joining metal or other parts and which in one operation taps and forms the cooperating thread in one of the parts and joins these parts together in rigid assembly, and to a novel method of forming the screw.

In the application of screws to thread-forming operations, because of the coarse threads of prior self-tapping thread-cutting screws, the approach to the work is at an undesirable angle for driving the screw; the desirable angle being perpendicular or 90° from the face of the opening. Also, the present commercial forms of fine thread machine screws require substantially more torque to drive the screw than is desirable. The novel screw herein disclosed solves these problems in the formation of a screw having a fine thread and a reduced end or relieved point which is readily insertable into a pilot opening in the part to be internally threaded whereby it is possible to drive the novel thread-forming screw straighter, eliminate the high driving torques of prior screws and yet provide a high stripping torque, and also provide a tighter fit which is not susceptible of loosening under vibration.

Among the objects of the present invention is the provision of a novel self-tapping or thread-forming screw or fastening element for fastening together metal or other parts to be joined, such fastening being accomplished without the necessity of cutting as distinguished from forming a thread as herein disclosed in a part to be joined. The screw has a novel interrupted thread-forming portion as its tapered end which provides the means for forming a thread in a preformed pilot opening in one of the parts and a continuous thread to the head of the screw for joining together the parts in rigid assembly.

Another object of the present invention is the provision of a novel self-tapping or thread-forming screw for forming by a novel swaging action an internal thread in a part of the sheet metal or other material about a preformed pilot opening without cutting into the metal so that the operation is substantially chip-free, thus making it particularly useful in electrical products. The thread is formed in the metal or material of the part to be joined by a progressive swaging or deforming operation whereby the mating thread formed in this operation provides a much closer fit with a full pitch diameter of the screw than possible where the thread is produced in a cutting operation. This closer fit results in a high strip-out of the threads under tension.

The present invention further comprehends a novel method and manner of forming the novel thread-forming screw, in which the shank of the blank is initially formed with a tapered end and this end is provided with four equally-spaced flattened sides which may be extruded or otherwise formed thereon. Then the blank with its four flattened sides is formed with the novel thread by a pressure rolling action in which the blank is rolled counterclockwise between a stationary die and a reciprocating die with the threads rolled on the blank on the forward movement of the reciprocating die. The diameter of the shank of the blank is greater than the root diameter of the formed thread and less than the maximum diameter of the thread, with the pressure-rolled thread being formed progressively as it is rolled between the dies.

A further object of the present invention is the provision of a novel self-tapping screw which, due to its method of forming, strengthens the thread surface of the object wherein the threads are formed. By means of this swaging formation of the threads by the screw there is effected a denser metal grain structure at the thread surface and about the mating threads than can be obtained by a cutting operation or with prior tapping screws. A burnishing operation is also performed by the screw which contributes to a low driving torque for the screw and an extremely close fit.

The present invention also contemplates the provision of a novel self-tapping screw having a four-sided chamfer-threaded point which is formed by extruding or the like a blank with a tapered conical end, then forming this end with four symmetrically arranged flats tapered on the cone end before threading of the blank is effected. The threads so formed are unlike those produced in prior self-tapping screws where one or more flattened surfaces are ground or milled after the threading operation. This creates four con-eccentric corners to a given radius smaller than the major diameter of the threaded article and develops a novel contour with a lead edge which progressively swages the full thread and an eccentric relief on the back side of this edge allowing a lower driving torque.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view in side elevation of the screw blank after forming of its head and tapered point but before rolling of its spiral thread.

FIG. 2 is an enlarged end elevation of the screw blank taken on the line 2—2 of FIG. 1.

FIG. 3 is a fragmentary view in side elevation of the tapered end of the screw blank of FIG. 1 but rotated through an arc of 45° from the position shown in FIG. 1.

FIG. 4 is an enlarged fragmentary side elevational view of the tapping or thread-forming end of the screw after the threading operation.

FIG. 5 is a side elevational view of the novel self-tapping screw shown entering a preformed pilot opening in the lower of two metal parts to be joined and in which lower metal part a thread is about to be formed and the parts joined.

FIG. 6 is another side elevational view but showing the screw threaded into its position of final assembly but rotated through approximately 45° from the position shown in FIG. 5.

FIG. 7 is an end elevational view of FIG. 4 taken on the line 7—7 of FIG. 4.

FIG. 8 is a view in horizontal cross section taken in a plane represented by the line 8—8 of FIG. 4.

FIG. 9 is a view in horizontal cross section taken in a plane represented by the line 9—9 of FIG. 4.

FIG. 10 is a view in horizontal cross section taken in a plane represented by the line 10—10 of FIG. 4.

FIG. 11 is a view in horizontal cross section taken in a plane represented by the line 11—11 of FIG. 4.

FIG. 12 is a view in horizontal cross section taken in a plane represented by the line 12—12 of FIG. 4.

FIG. 13 is a view in horizontal cross section taken in a plane represented by the line 13—13 of FIG. 4.

FIG. 14 is a diagrammatic view of a stationary and reciprocating die for forming the screw thread on a blank.

Referring to the disclosure in the drawing and more particularly to the novel embodiment of a self-tapping or thread-forming screw constructed in accordance with the present invention, FIG. 1 discloses a blank 10 such as of drawn wire which is initially formed to provide a suitable head 11 at one end of the shank 12 and a tapered or conical portion 13 terminating in an end 14 opposite the head 11. Four symmetrically arranged and spaced flattened sides 15 are formed along the tapered portion by suitable means such as extruding, the flattened areas tapering outwardly toward the end 14 with alternate and rounded tapering ridges or corners 16 therebetween. These flattened sides 15 conform the end 14 as a substantially square extremity with rounded corners 16 having a given uniform radius as seen in FIG. 2. At the end extremity each flattened side merges into a rounded edge 15$^a$ defining a cylindrical recess 15$^b$.

FIG. 14 shows diagrammatically a stationary die A, a reciprocating die B and the shank 12 of the blank 10. The formed thread is progressively rolled on the blank as the later rotates in a counter-clockwise direction and as the reciprocating die is moving in the direction of the arrow. The diameter of the shank of the blank prior to the pressure rolling operating in forming the thread, is greater than the root diameter of the formed thread and smaller or less than the maximum diameter of the thread.

A fine continuous spiral thread 17 is rolled onto the shank 12 and the corners 16 of the conical portion 13 with the thread being interrupted by the flattened areas or sides 15 in the manner shown in FIG. 4, and the interrupted thread on the tapered portion 13 of the blank having relatively wide and dished or concaved crests 18. The width of the interrupted portions of the thread varies and decreases toward the head, where it merges into the continuous portion of the thread extending to the head. The interrupted portions of the thread so formed provide for the initial swaging action when the screw is inserted into a preformed pilot opening 19 in a part 20 to be threaded. It should be noted in the disclosed embodiment of FIG. 5 that there are approximately 3 to 4 pitches of the interrupted thread which enter the pilot opening that are imperfect or flat from the end of the screw to the point where a thread is being formed, and these initial pitches of the thread will be undersize due to lack of material because of the taper.

With reference to FIGS. 4, 7, 8, 9, 10, 11, 12 and 13, as the formation of the thread to be formed progresses, eccentric reliefs are generated which are important to the present invention. The flattened areas 15 of the blank as shown in FIGS. 1, 2 and 3 become slightly concave as at 21 (FIG. 7) to provide areas of full relief. The threaded portions between the full relief areas are shown in FIGS. 8 to 13, inclusive, as sectional views taken at each successive pitch or distance between adjacent thread portions to more accurately disclose the conformation of the interrupted thread-forming portions.

In the successive sectional views, this lead edge varies along the screw from the end 14 to the portion where the initially flattened portions or areas 15 end. In other words, the lead edge shown in FIG. 8 of the end thread portion is designated by the reference numeral 22, its substantially concentric land portion is designated by the numeral 23 and its eccentric trailing edge or relief portion is designated by the numeral 24. At the next or adjacent thread portion or pitch shown in FIG. 9, the leading edge is designated by the numeral 22$^a$, the substantially concentric land portion as 23$^a$ and the trailing edge or relief portion as 24$^a$. In sucessive thread portions separated by one pitch, as shown in FIGS. 10, 11, 12 and 13, the leading edges are designated as 22$^b$, 22$^c$, 22$^d$ and 22$^e$, respectively, the substantially concentric land portions are designated as 23$^b$, 23$^c$, 23$^d$ and 23$^e$, respectively, and the eccentric trailing edges or relief portions are designated as 24$^b$, 24$^c$, 24$^d$ and 24$^e$, respectively.

These FIGS. 8 to 13, inclusive, show the manner in which the interrupted thread-forming portions of the screw 25 vary in forming the thread 26 in the pilot opening 19 of the metal or other part 20 to be threaded and joined to an abutting or other metal part 27 having an opening 28 of a diameter greater than the pitch diameter of the screw 25.

In applying the present novel self-tapping screw 25, its reduced end 29 is aligned with and enters the pilot opening 19 in the work piece or sheet metal or other part 20 (FIGS. 5 and 6). The reduced end 29 enters the opening 19 to the extent of approximately two or three pitches and the screw is then forced against the work and turned as by means of a conventional or power-driven tool having a bit conformably engaging the head 11. Rotation of and axial pressure applied to the tool causes the screw 25 to be turned in the pilot opening 19 to form a continuous spiral thread 26 to receive the complementary spiral thread 17 on the shank of the screw 25.

No metal or chips are removed during the threading operation. The leading edges 22, 22$^a$, 22$^b$, 22$^c$, 22$^d$ and 22$^e$ of successive thread portions do not cut into the metal but the metal of successive thread portions are progressively swaged by these leading edges. The successive substantially concentric land portions 23, 23$^a$, 23$^b$, 23$^c$, 23$^d$ and 23$^e$ continue the swaging action to further deform the metal and the successive trailing edges of eccentric relief portions 24 allow for the expansion of the deformed metal. The full relief areas 21 provide for a lower driving torque than if a full thread provides the swaging formation. As no metal is cut away by the novel manner of forming the thread in the opening 19, the metal forms a much closer fit or cooperation with the mating threads of the screw as the screw is driven to its final position securing the sheet metal or other parts together (FIG. 6).

Further, the progressive swaging formation of the mating thread on the piece or part being threaded provides a denser metal grain structure thereat than can be secured by the conventional cutting of the threads. A burnishing action on the thread surfaces also contributes to the low driving torque and extremely close fit.

Under test conditions, a comparison was made between the thread-forming or self-tapping screw of the present invention and a comparable presently used threading screw known commercially as a "type D" screw. This threading screw includes a tapered threading end with an offset and relatively deep longitudinal slot providing a serrated cutting edge; said slot extending from the end of the screw upwardly to or beyond the end of the tapered portion. One of the screws of the present invention showed an average drive torque of 12 inch pounds and an average strip torque of 48 inch pounds. For a comparable size "type D" screw, the average drive torque was 19 inch pounds and the average strip torque of 44 inch pounds. Thus, the ratio of strip to drive torque for the present invention is 4:1 while that of the "type D" screw is 2.3:1. This is but one of important features of the present novel thread-forming screw which has other improved characteristics as previously disclosed over the commonly used and prior types of tapping screws.

Having thus disclosed the invention, I claim:

1. A metal fastener having a continuous thread for threaded engagement with a mating thread in a member to be supported thereby and a thread-forming part for forming said mating thread in an opening formed in said member, comprising a screw having a spirally threaded cylindrical shank with a head at one end and a reduced tapered thread-forming part at the other end, the metal in said thread-forming part being compacted to taper and reduce its cross section and provide a reduced substantially polygonal end portion with uniformly spaced and compacted relief areas widening toward the end of the reduced end portion, the other end of the thread-forming part merging into the adjoining cylindrical shank with the latter having a continuous spiral thread of full thread depth, said reduced tapered thread-forming part having uniformly spaced convex lands extending to the end of the screw between said relief areas, said relief areas being generally flat adjacent the end of the tapered part and having transverse end edges which project axially beyond the lands with maximum projection intermediate the ends of said edges to define a recessed screw end, said lands having spiral thread portions interrupted by said spaced relief areas to provide spaced helices concentric with the axis of the shank and extending over said lands with the threaded helices which adjoin the full thread of the cylindrical shank being continuous except for their crests being interrupted in axial alignment with said relief areas, said helices from said full thread portion and toward said end portion being provided with progressively dished and widened ridges with said helices extending to the polygonal end portion and along said lands with the interrupted thread portions provided with lobes having blunt, non-cutting leading swaging edges, generally convex portions and trailing edges with said leading and trailing edges merging into said relief areas, said relief areas being separated by the generally concentric helices with their interrupted thread portions varying in length and contour in successive helices, the threaded land portions extending to the end of the thread-forming part and the concentric threaded portion at said end extending circumferentially about the convex land portion, said helices being devoid of cutting surfaces to progressively swage a thread by plastic deformation in a member to be joined by said screw.

2. A metal fastener as set forth in claim 1, in which said relief areas gradually merge from a generally flat to a dished area away from the end of the screw and toward the threaded shank.

References Cited by the Examiner
UNITED STATES PATENTS

| | | | |
|---|---|---|---|
| 1,676,482 | 7/1928 | De Lapotterie | 10—52 |
| 1,912,517 | 6/1933 | De Lapotterie | 10—52 |
| 2,062,550 | 12/1936 | Brown | 85—47 |
| 2,165,009 | 7/1939 | Rosenberg | 85—47 |
| 2,165,011 | 7/1939 | Rosenberg | 85—48 |
| 2,263,424 | 11/1941 | Langer | 85—47 |
| 2,352,982 | 7/1944 | Tomalis | 85—47 |
| 2,479,730 | 8/1949 | Dewar | 85—47 |
| 2,703,419 | 3/1955 | Barth | 85—47 |
| 2,740,136 | 4/1956 | Chiaberta | 10—10 |

EDWARD C. ALLEN, *Primary Examiner.*

CARL W. TOMLIN, M. HENSON WOOD, JR.,
*Examiners.*